United States Patent
Tremblay et al.

(10) Patent No.: US 11,925,852 B2
(45) Date of Patent: Mar. 12, 2024

(54) SYSTEMS AND METHODS FOR REAL-TIME BALLISTIC COMPUTATIONS TO IMPROVE GOLF TECHNIQUE

(71) Applicant: D.O.P.E. Golf, LLC, Walpole, MA (US)

(72) Inventors: Ryan Tremblay, Fayetteville, NC (US); Ross Negele, Walpole, MA (US)

(73) Assignee: D.O.P.E. Golf, LLC, Walpole, MA (US)

( * ) Notice: Subject to any disclaimer, the term of this patent is extended or adjusted under 35 U.S.C. 154(b) by 290 days.

(21) Appl. No.: 17/385,781

(22) Filed: Jul. 26, 2021

(65) Prior Publication Data
US 2022/0032160 A1 Feb. 3, 2022

Related U.S. Application Data

(60) Provisional application No. 63/059,128, filed on Jul. 30, 2020.

(51) Int. Cl.
*A63B 71/06* (2006.01)
(52) U.S. Cl.
CPC ...... *A63B 71/0622* (2013.01); *A63B 2220/72* (2013.01); *A63B 2220/74* (2013.01); *A63B 2220/75* (2013.01)
(58) Field of Classification Search
CPC ............ A63B 71/0622; A63B 2220/72; A63B 2220/74; A63B 2220/75
See application file for complete search history.

(56) References Cited

U.S. PATENT DOCUMENTS

| | | | | |
|---|---|---|---|---|
| 2011/0256944 A1* | 10/2011 | Sato | ........................ | G06F 30/28 473/165 |
| 2011/0319199 A1 | 12/2011 | Voges et al. | | |
| 2012/0316843 A1* | 12/2012 | Beno | .................. | G06Q 10/0639 703/2 |
| 2013/0184089 A1* | 7/2013 | Rauchholz | ........... | A63B 53/047 473/221 |
| 2013/0184091 A1* | 7/2013 | Rauchholz | ............. | A63B 60/22 473/238 |
| 2014/0335978 A1* | 11/2014 | Dugan | ............... | A63B 24/0006 473/464 |

(Continued)

OTHER PUBLICATIONS

International Search Report issued in International Application No. PCT/US2021/044040, dated Nov. 19, 2021.

*Primary Examiner* — Malina D. Blaise
(74) *Attorney, Agent, or Firm* — Volpe Koenig

(57) ABSTRACT

In some aspects, the disclosure is directed to methods and systems for determining ballistics of golf balls in different atmospheric conditions. The system can receive a set of characteristics for a plurality of golf swings of a golf ball under baseline atmospheric condition. The system can generating a player profile comprising an average of each of the set of characteristics for the plurality of golf swings. The system can identify a second atmospheric conditions different from the baseline atmospheric conditions. The system can calculate a predicted distance traveled by the golf ball if hit by a golf swing under the second atmospheric conditions. The system can present, in a graphical user interface, the predicted distance traveled by the golf ball under the second atmospheric conditions.

17 Claims, 4 Drawing Sheets

(56) References Cited

U.S. PATENT DOCUMENTS

| | | | |
|---|---|---|---|
| 2015/0057108 A1* | 2/2015 | Regimbal | H04M 1/72427 |
| | | | 473/407 |
| 2015/0189348 A1* | 7/2015 | Wang | H04N 21/26603 |
| | | | 725/51 |
| 2016/0206945 A1* | 7/2016 | Nusbaum | A63B 69/3614 |
| 2018/0099183 A1* | 4/2018 | Niegowski | A63B 69/3632 |
| 2018/0204227 A1* | 7/2018 | Mohindru | G06F 3/04886 |
| 2018/0243609 A1* | 8/2018 | Dugan | A63B 69/3608 |

* cited by examiner

SYSTEMS AND METHODS FOR REAL-TIME BALLISTIC COMPUTATIONS TO IMPROVE GOLF TECHNIQUE

RELATED APPLICATIONS

The present application claims the benefit of and priority to U.S. Provisional Patent Application No. 63/059,128, entitled "Systems and Methods for Real-Time Ballistic Computations to Improve Golf Technique," filed Jul. 30, 2020, the entirety of which is incorporated by reference herein.

FIELD OF THE DISCLOSURE

This disclosure generally relates to systems and methods for ballistic computations in conjunction with real-time monitoring of golf swing characteristics. In particular, this disclosure relates to systems and methods for applying ballistic computations accounting atmospherics and other conditions in conjunction with player metrics to improve overall the player's accuracy and swing technique.

BACKGROUND OF THE DISCLOSURE

Golf is a sport that involves using various clubs to accurately hit balls into a series of holes on a course in as few strokes as possible. Because the balls are small and often hit a great distance away from the target holes, proper technique is crucial to a successful game. Generally, golf technique is improved through practice and manual instruction by a golf professional. But golf professionals may be unreachable, expensive, and inconsistent in their instruction. Further, atmospheric conditions can vary by time and location, and can significantly affect the outcome of golf swings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for real-time ballistic computations to improve golf technique, in accordance with one or more implementations.

A. Computing Environment

Aspects of the operating environment as well as associated system components (e.g., hardware elements) in connection with the methods and systems described herein are detailed in this section.

Figure 1A:
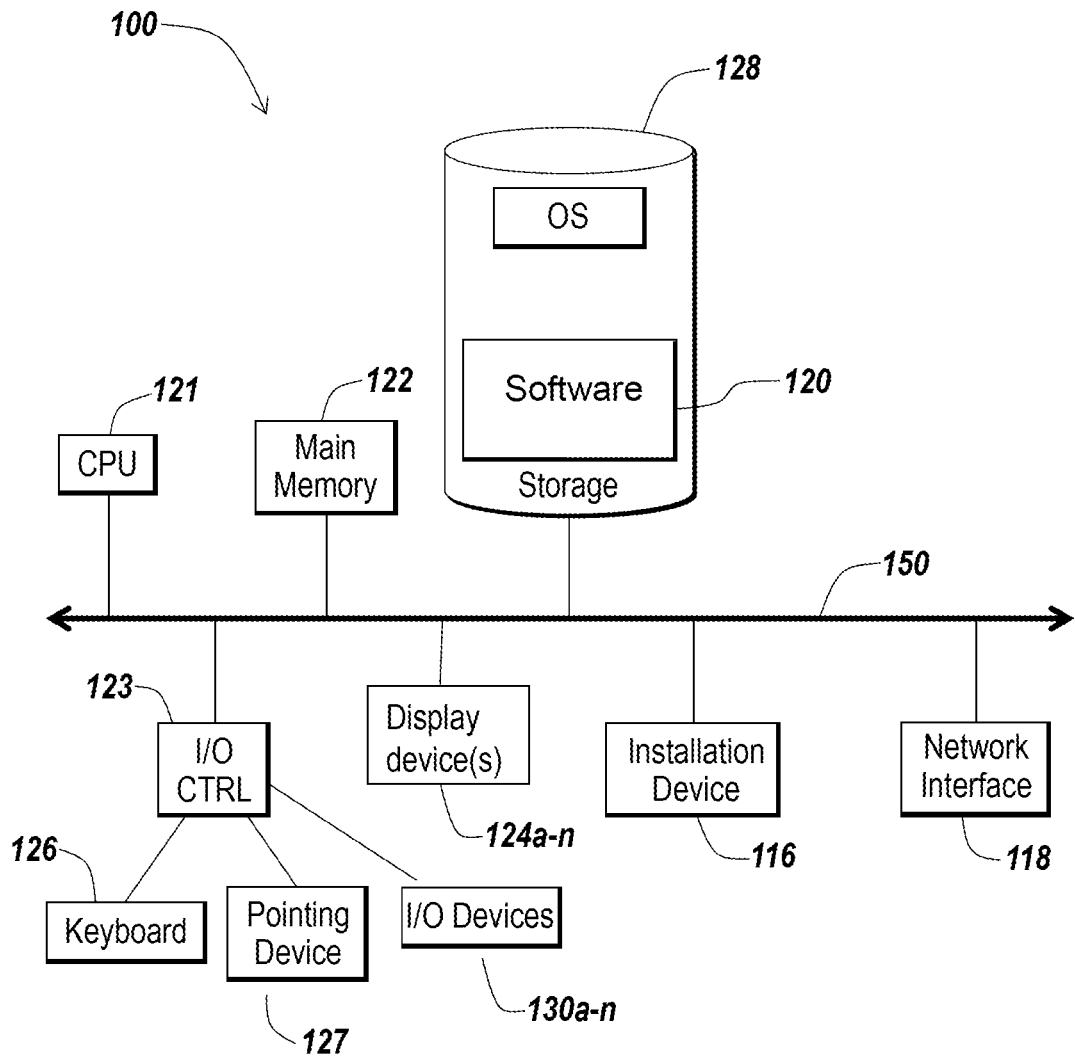
FIGS. 1A and 1B are block diagrams depicting embodiments of computing devices useful in connection with the methods and systems described herein.
Figure 1B:
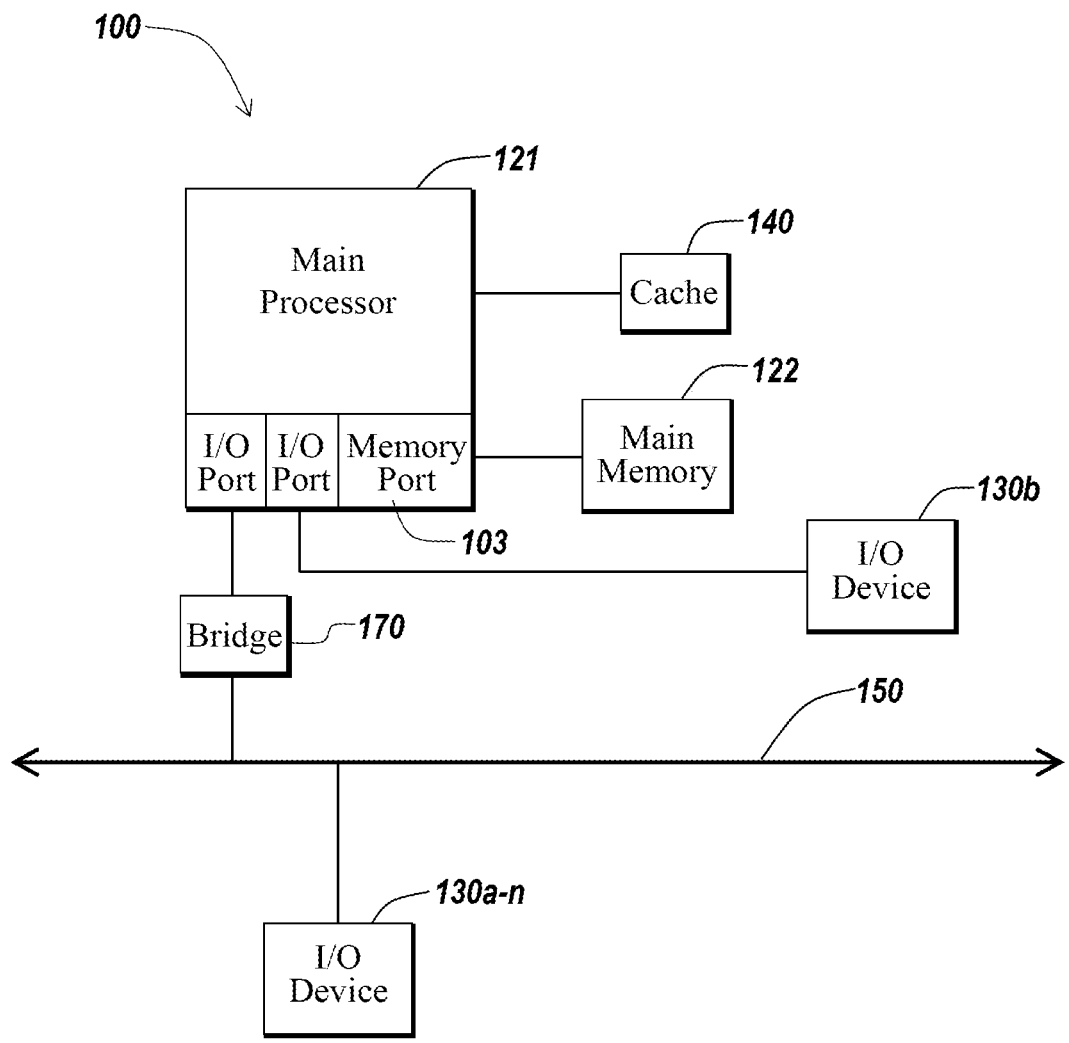

The systems discussed herein may be deployed as and/or executed on any type and form of computing device, such as a computer, network device or appliance capable of communicating on any type and form of network and performing the operations described herein. FIGS. 1A and 1B depict block diagrams of a computing device 100 useful for practicing an embodiment of the wireless communication devices 102 or the access point 106. As shown in FIGS. 1A and 1B, each computing device 100 includes a central processing unit 121, and a main memory unit 122. As shown in FIG. 1A, a computing device 100 may include a storage device 128, an installation device 116, a network interface 118, an I/O controller 123, display devices 124*a*-124*n*, a keyboard 126 and a pointing device 127, such as a mouse. The storage device 128 may include, without limitation, an operating system and/or software. As shown in FIG. 1B, each computing device 100 may also include additional optional elements, such as a memory port 103, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 100 may be based on any of these processors, or any other processor capable of operating as described herein.

Main memory unit 122 may be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1A, the processor 121 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1B depicts an embodiment of a computer 100 in which the main processor 121 may communicate directly with I/O device 130b, for example via HYPERTRANSPORT, RAPIDIO, or INFINIBAND communications technology. FIG. 1B also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, California.

Referring again to FIG. 1A, the computing device 100 may support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 may further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may include or be connected to one or more display devices 124a-124n. As such, any of the I/O devices 130a-130n and/or the I/O controller 123 may include any type and/or form of suitable hardware, software, or combination of hardware and software to support, enable or provide for the connection and use of the display device(s) 124a-124n by the computing device 100. For example, the computing device 100 may include any type and/or form of video adapter, video card, driver, and/or library to interface, communicate, connect or otherwise use the display device(s) 124a-124n. In one embodiment, a video adapter may include multiple connectors to interface to the display device(s) 124a-124n. In other embodiments, the computing device 100 may include multiple video adapters, with each video adapter connected to the display device(s) 124a-124n. In some embodiments, any portion of the operating system of the computing device 100 may be configured for using multiple displays 124a-124n. One ordinarily skilled in the art will recognize and appreciate the various ways and embodiments that a computing device 100 may be configured to have one or more display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1A and 1B may operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

B. Real-Time Ballistic Computations to Improve Golf Technique

This technical solution provides a ballistic computer, such as those traditionally used in the field of long range ballistic marksmanship that is modified to improve golfing techniques of individual players. By finding the ball flight characteristics produced by each specific golfer, swing, and the clubs being used, and by using a launch monitor computing device to capture data relating to at least these factors, this technical solution can provide suggestions on to the golfer about how far his ball will go given a change in temperature, humidity, barometric pressure, and elevation. Further, the systems and methods of this technical solution can provide a mobile application that can present a graphical user interface including such information.

The trajectory of a golf ball can be governed by numerous factors and forces. For example, certain golf clubs apply force differently to a golf ball upon impact, may have different aerodynamic properties affecting swing velocity, and may produce undesired results based on atmospheric conditions. To compensate for these issues, the systems and methods of this technical solution can provide a ballistic computer specialized in the form of a mobile application for determining and tracking the trajectory of a golf ball. The mobile application can access player information, for example from a player profile, that can include player data such as golf club types, average golf club swing velocity, average golf club head speed, and average golf club swing angle, among others. The player information may be stored locally in a database, or in a remote database that maintains a player profile.

The systems and methods of this technical solution can identify and determine specific ball flight characteristics produced by each club when swung. This information can be gathered, for example, by communicating with at least one launch monitor or other data. In some implementations, the mobile application can be used to gather information about the player, for example to assemble, generate, or otherwise create a user profile, using a launch monitor. Using input gathered from the user via the graphical user interface, the application executing on the mobile device may update or populate the player profiles as described herein.

Baseline ballistic information gathered via the mobile device (e.g., from a launch monitor, or high speed camera, etc.) can be used to tell the golfer (e.g., the player or user of the mobile device) how far their ball will go given a change in temperature, humidity, and/or barometric pressure (elevation). If the golfer plays in the morning or afternoon, summer or winter, or travels to a different state or country to golf, there will be not only noticeable, but sometimes drastic changes in their yardages (e.g., overall distance for a ball, etc.) for each club. Generally, one way to account for this is by using a launch monitor, but these can be expensive (e.g., cost upwards of $20,000, etc.). Professional golfers may use launch monitors prior to each round to find the distance they can hit with a given club. But the average golfer may not have frequent access to a launch monitor. Further, a launch monitor would only provide for their current location and atmospheric conditions, requiring the re-use of the extra equipment each time the location or temperature changes.

Other implementations may allow the user to hit a ball, walk to it, mark it and track their hit distance manually, but it gives the user their overall distance, including roll, which is not consistent and it is linear, as it only tracks distance and does not take into account the golf balls ballistic characteristics and atmospherics.

In contrast, the systems and methods of this technical solution can create, set, and maintain a player profile including constants in the application, such as a local or remote database or data storage. The player constants values in the profile can include information about various golf clubs used by the user, including club type, golf club shaft type and flex, or the preferred type or brand of golf ball used. This technical solution can collect their ballistic averages for each club, and generate a personalized player profile that includes this information. This technical solution can also provide a ballistic forecasting feature, which can allow the player to forecast predicted ballistic information 12 hours ahead. For example, if there is a weather front coming in, or a drastic change in atmospherics during a future time, this technical solution can access and retrieve forecasted weather data and compute golf ball ballistic information given the predicted changes in atmospherics. The player can use this information, for example, to compensate for undesirable future weather conditions. This is particularly useful when the real-time use of the systems and methods described herein may be prohibited by organizational rules or rules of competitive play.

The systems and methods of this technical solution can utilize a launch monitor (e.g. or a high-speed camera, etc.) to establish a baseline profile. Then, this technical solution can utilize the output features of the launch monitor to identify the distance a ball will travel using the baseline player profile and currently monitored temperature and atmospheric data. Accordingly, this technical solution allows for accurate computations of real-time golf ball ballistic data without the use of extra equipment (e.g., an expensive launch monitor, etc.) which is an improvement to golf ball tracking systems.

The mobile device can execute, for example, on a smartphone, which can download accurate and up-to-date atmospheric data from given a location in real time. The application can be used to be used prior to and during a round of golf and does not need any specialized equipment to operate.

This technical solution can implement computer hardware or software that provides ballistic computations that are tailored to golf. Testing the accuracy of this technical solution, or otherwise calibrate aspects of this technical solution, can be performed in conjunction with a launch monitor. Using publically available or privately maintained atmospheric data based on a provided GPS location, the application can determine and provide real-time ballistic computations of predicted golf ball distance. The ballistic computations can be based on, for example, flight data of various golfers, clubs, and golf balls that may be gathered via launch monitor device. The golfer's ball flight data can include golf ball spin rate, max ord, golf ball carry distance, golf ball speed, and player swing speed. The golf ball flight data can be stored, for example, in one or more data structures in a data storage memory as part of a user profile. In some implementations, the data used to establish a ballistic profile can be entered manually by the player (e.g., via the graphical user interface provided by the application, etc.). In another implementation, the ballistic data can be gathered directly from a launch monitor.

At least one other aspect of this technical solution includes a laser range finder with Bluetooth capability to upload the golfers data, lase (determine distance to) the flag (e.g., the flag marking the position of the target hole), and tell the player which club to use based on the changes in atmospherics. The range finder will can read the winds (e.g., gather speed and direction data, etc.) between the golfer and the target, and give the golfer a red target line to account for hold off due to wind.

Accordingly, the systems and methods of this technical solution can identify accurate distances that a player may hit in certain atmospheric conditions for each club that the player uses. This technical solution can compensate for future or current changes in atmospheric conditions, and can provide updated ballistic computation data in real-time. Further, after establishing a baseline profile for a player, this technical solution can operate without the use of external equipment such as a launch monitor. Instead, this technical solution can be provided on a mobile device of player, such as a smartphone, and produce a ballistic solution for a predicted location (e.g., distance from the player) that the golf ball with land given a particular club.

Figure 2:
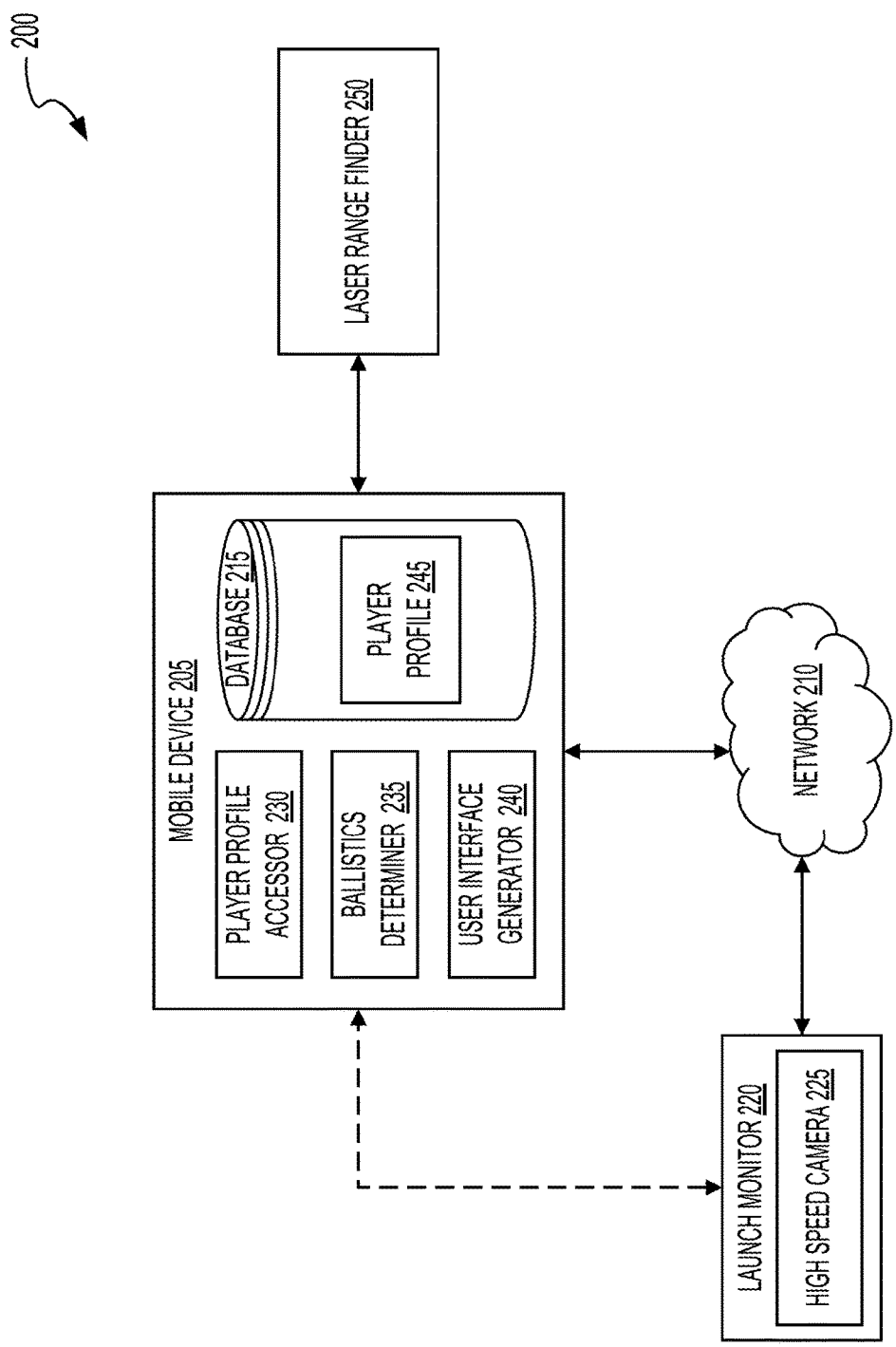
FIG. 2 is a block diagram illustrating an example system for using real-time ballistic computations to determine a predicted distance of a golf ball based on player profile information.

Referring now to FIG. 2, depicted is an example system 200 for real-time ballistic computations to determine a predicted distance of a golf ball given a golf club and to improve the golf technique (e.g., club selection, etc.) of the player. The system 200 can include at least one mobile device 205, at least one network 210, at least one launch monitor 220, and at least one laser range finder 250. The mobile device 205 can include at least one player profile accessor 230, at least one ballistics determiner 235, at least one user interface generator 240, and at least one database 215. The database 215 can maintain, store, or otherwise include at least one player profile. The launch monitor can include at least one high speed camera 225.

Each of the player profile accessor 230, ballistics determiner 235, user interface generator 240, database 215, mobile device 205, launch monitor 220, and laser range finder 250 of the system 200 can be implemented using the hardware components or a combination of software with the hardware components of a computing system (e.g., computing system 100 or any other computing system described herein, etc.) detailed herein in conjunction with FIGS. 1A-1B. Each of the components of the mobile device 205 can perform any of the functionalities detailed herein.

The mobile device 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The mobile device 205 can include one or more computing devices or servers that can perform various functions as described herein. The mobile device 205 can include any or all of the components and perform any or all of the functions of the computer system 100 described herein in conjunction with FIGS. 1A-1B.

The network 210 can include computer networks such as the Internet, local, wide, metro or other area networks, intranets, satellite networks, other computer networks such as voice or data mobile phone communication networks, and combinations thereof. The mobile device 205 of the system 200 as described herein can communicate via the network 210, for instance with at least one launch monitor 220 or at least one laser range finder 250. The network 210 may be any form of computer network that can relay information between the mobile device 205, other computing devices, and one or more content sources, such as web servers, weather forecasting servers, or servers that maintain atmospheric conditions, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the mobile device 205, the computer system 100, the launch monitor 220, other computing devices described herein, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the mobile device 205, the computer system 100, the launch monitor 220, other computing devices described herein, etc.) may also communicate wirelessly with the computing devices of the network 210 via a proxy device (e.g., a router, network switch, or gateway).

The laser range finder 250 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The laser range finder 250 can include one or more computing devices or servers that can perform various functions as described herein. The laser range finder 250 can include any or all of the components and perform any or all of the functions of the computer system 100 described herein in conjunction with FIGS. 1A-1B. The laser range finder can communicate wirelessly via Bluetooth with the mobile device 205. In some implementations, the laser range finder 250 may communicate with the mobile device 205 as described herein via one or more messages transmitted or received via the network 210.

The laser range finder 250 can communicate with at least one mobile device 205 and provide distance data and wind data for use in ballistic computations. For example, the laser range finder 250 can upload the golfers data, lase (determine distance to) the flag (e.g., the flag marking the position of the target hole), and tell the player which club to use based on the changes in atmospherics. The range finder will can read the winds (e.g., gather speed and direction data, etc.) between the golfer and the target, and give the golfer a red target line to account for hold off due to wind.

The launch monitor 220 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The launch monitor 220 can include one or more computing devices or servers that can perform various functions as described herein. The launch monitor 220 can include any or all of the components and perform any or all of the functions of the computer system 100 described herein in conjunction with FIGS. 1A-1B. The laser range finder can communicate wirelessly via Bluetooth with the mobile device 205 (e.g., as depicted by the dotted line in FIG. 2). In some implementations, the launch monitor 220 may communicate with the mobile device 205 as described herein via one or more messages transmitted or received via the network 210.

The launch monitor 220 can gather various information about a player's golf swing and provide it to the mobile device 205 for the creation of a baseline player profile. For example, the launch monitor 220 can provide the mobile device with information about flight data of the player, clubs used by the player, and golf balls used by the player. The flight data can include golf ball spin rate, max ord, golf ball carry distance, golf ball speed, and player swing speed. The information gathered by the launch monitor 220 can be provided to the mobile device 205, which can store the information, for example, in one or more data structures in a data storage memory as part of a user profile, such as the player profile 245.

The launch monitor 220 can include at least one high-speed camera 225, and can utilize Doppler radar to monitor the launch, full ball flight, club delivery and ball roll of a golf ball hit by the player. The launch monitor 220 can be set up behind the golfer. With each swing, the launch monitor 220 can measure every aspect of the club movement, the trajectory of the ball, and its landing. The launch monitor 220 can be equipped with a high-speed camera 225 to provide slow motion video data for analysis by the player or one or more of the computing devices described herein. Rather than calculating the projectile motion of the golf ball from initial launch parameters, the launch monitor 220 can track the entire flight of the ball from the moment of impact to the point where the ball comes to rest. The high-speed camera 225 can be any type of video camera, such as a video camera capable of capture more than 120 frames-per-second of video. This video can be transmitted, streamed, or otherwise provided to the mobile device 205.

The database 215 can be a database or other computer storage configured to store and/or maintain any of the information described herein. The data storage 315 can maintain one or more data structures, which may contain, index, or otherwise store each of the values, pluralities, sets, variables, vectors, or thresholds described herein. The data storage 315 can be accessed using one or more memory addresses, index values, or identifiers of any item, structure, or region maintained in the data storage 315. The data storage 315 can be accessed by the components of the mobile device 205, or any other computing device described herein, via the network 210. In some implementations, the data storage 315 can be internal to the mobile device 205. In some implementations, the data storage 315 can exist external to the mobile device 205, and may be accessed via the network 210. The data storage 315 can be distributed across many different computer systems or storage elements, and may be accessed via the network 210 or a suitable computer bus interface. The mobile device 205 can store, in one or more regions of the memory of the mobile device 205, or in the data storage 315, the results of any or all computations, determinations, selections, identifications, generations, constructions, or calculations in one or more data structures indexed or identified with appropriate values. Any or all values stored in the data storage 315 may be accessed by any computing device described herein, such as the mobile device 205, to perform any of the functionalities or functions described herein.

The player profile 245 may be generated, created, maintained, and updated by the mobile device 205. The player profile 245 can include an identifier of the player, an identifier of the mobile device, and identifiers and data relating to one or more clubs of the player or baseline atmospheric conditions under which the data in the player profile 245 was gathered. The player profile 245 can store or maintain any of the data gathered by the launch monitor 220, such as flight data of the player, clubs used by the player, and golf balls used by the player. The flight data can include golf ball spin rate, max ord, golf ball carry distance, golf ball speed, and player swing speed. All of this information can be averaged information, or information that is gathered into many data points that are then averaged (or weighted averaged, etc.) to arrive at average player flight information under certain baseline atmospheric conditions.

The player profile accessor 230 can receive player data from the launch monitor 220 to generate or update the player profile 245. For example, the player profile accessor 230 can receive maintain any of the data gathered by the launch monitor 220, such as flight data of the player, clubs used by the player, and golf balls used by the player. The flight data can include golf ball spin rate, max ord, golf ball carry distance, golf ball speed, and player swing speed. All of this information can be averaged information, or information that is gathered into many data points that are then averaged (or weighted averaged, etc.) to arrive at average player flight information under certain baseline atmospheric conditions. The player profile accessor 230 can store this information as the player profile. To store the baseline atmospheric conditions, the player profile accessor 230 can receive atmospheric conditions, for example, temperature, humidity, barometric pressure, GPS coordinates of the mobile device 205, and elevation, from one or more data sources via the network 210 or from one or more components of the mobile device 205.

The player profile accessor 230 can determine if enough data has been received to create a baseline player profile. For example, the player profile accessor 230 may use a predetermined number of data points (e.g., 5, 10, 20, 25, etc.) prior to averaging the flight data for each club of the player. The player profile accessor 230 can utilize a counter to count the number of data points (e.g., swings, etc.) captured by the launch monitor 220. If the counter is equal to or greater than a threshold number of swings, the player profile accessor 230 can determine that enough data has been gathered to generate a user profile. If the counter is less than or equal to the threshold, the player profile accessor 230 can continue to gather swing data from the launch monitor 220.

The player profile accessor 230 can average the swing data and the flight data received from the launch monitor 220 to generate a user profile. For example, for each swing recorded by the launch monitor 220, the player profile accessor 230 can receive and store that information in one or more data structures in the memory of the mobile device 205. To generate a baseline player profile, the player profile accessor 230 can average each aspect (e.g., golf ball spin rate, max ord, golf ball carry distance, golf ball speed, and player swing speed, etc.) of the swings for a particular club used by the user to arrive at an average player profile. The player profile accessor 230 can repeat this process for each club specified by the user.

The player profile accessor 230 can store the average player profile as the player profile 245 in the database 215. In some implementations, the player profile accessor 230 can access atmospheric conditions, such as those gathered from another computing device via the network 210, or from the launch monitor 220, and store the average player profile in association with the atmospheric conditions. As such, the baseline player swing and flight data is stored with information about the atmospheric conditions under which the swing and flight data was gathered, thereby creating a baseline profile for the player.

The ballistics determiner 235 can identify one or more atmospheric conditions. After establishing the profile, the mobile device 205, for example as part of an application, may provide the functionalities detailed herein above or the functionalities detailed herein below, for example allowing the player to specify golf clubs, manually specify atmospheric conditions, or automatically gather and display atmospheric conditions from one or more sensors on the mobile device 205 (e.g., thermometer, barometer, etc.), or from one or more other computing devices via the network 210. The other computing devices can maintain, for example, the atmospheric data, and provide it to the ballistics determiner 235 in response to a request from the ballistics determiner 235.

The ballistics determiner 235 can determine ballistics for the golf ball based on the atmospheric conditions and the average flight data in the player profile 245. For example, the flight pattern of the golf ball can be affected directly by the presence of air resistance and the rotation of the ball. Looking at both air resistance and rotation flight paths can be predicted. The air resistance and rotation are used to set up a system of differential equations that can be used to predict several different flight paths or distances. The temperature, elevation, barometric pressure, and wind speed can all effect the air resistance experienced by the golf ball. Example equations used to determine flight equations for a golf ball are included below:

$$\Sigma F_y = my'' - \text{Weight} - \text{AirResistance} + \text{MagnusForce}$$

$$\Sigma F_x = mx'' - \text{AirResistance} + \text{MagnusForce}$$

$$\Sigma F_z = mz'' - \text{AirResistance} + \text{MagnusForce}$$

Where Fy is the force in the vertical direction (y-axis) experienced by the golf ball, and Fx and Fz describe motion on the plane parallel to the ground (x-axis and z-axis). The Weight is the average weight of a golf ball, AirResistance is the air resistance force experienced by the golf ball (e.g., based on atmospheric conditions, etc.), and MagnusForce is the lift force experienced based on the average spin of the golf ball (e.g., caused by the dimples on the surface, etc.).

The air resistance can be calculated, for example, using the following equation:

$$R = \left(\frac{1}{2}\right) C_D \rho A V^2$$

Where R is the force of air resistance, Cd is the drag coefficient, ρ is the air density (e.g., calculated based on temperature, humidity, etc.), A is the surface area of the golf ball, and V is the average velocity of the golf ball.

The Magnus force can be calculated using the following equation:

$$F_M = S(\omega \times V)$$

Where Fm is the Magnus force, S is the Magnus coefficient, ω is the average angular velocity of the golf ball (e.g., calculated based off spin data, etc.), V is the average velocity of the golf ball, and × indicates a cross-produce operation. Using the force data, the mobile device can utilize Newton's laws of motion (e.g., F=ma, etc.) to calculate the exact distance the golf ball is likely to travel in the given atmospheric conditions. The ballistics determiner 235 can use the average values for the average initial speed and spin of the ball given a certain club in the above equations to accurately estimate the expected distance traveled by the golf ball under different atmospheric conditions. The ballistics determiner 235 can store the expected distance for a particular golf club and for a particular set of atmospheric conditions in one or more data structures in the memory of the mobile device 205 for use in computations by other components of the system 200.

The user interface generator 240 can generate a user interface to display or gather any of the information described herein. For example, the user may populate one or more data structures, profile information, average ballistics or flight information, or any other information used by the mobile device 205 or the components thereof. In addition, the user interface generator 240 can display or provide the results of any of the computations, for example in one or more windows, applications, or graphical representations on the mobile device 205. The user interface generator 240 can display, for example as text or an image, the current atmospheric data, projected atmospheric data, future atmospheric data, or the expected distance a golf ball will travel for a particular club and player profile 245. If, for example, data gathered from the laser range finder 250 indicates that the target hole is a certain distance away, the user interface generator 240 can display a club that will provide an average expected distance for a golf ball given the current or future atmospheric conditions.

Figure 3:
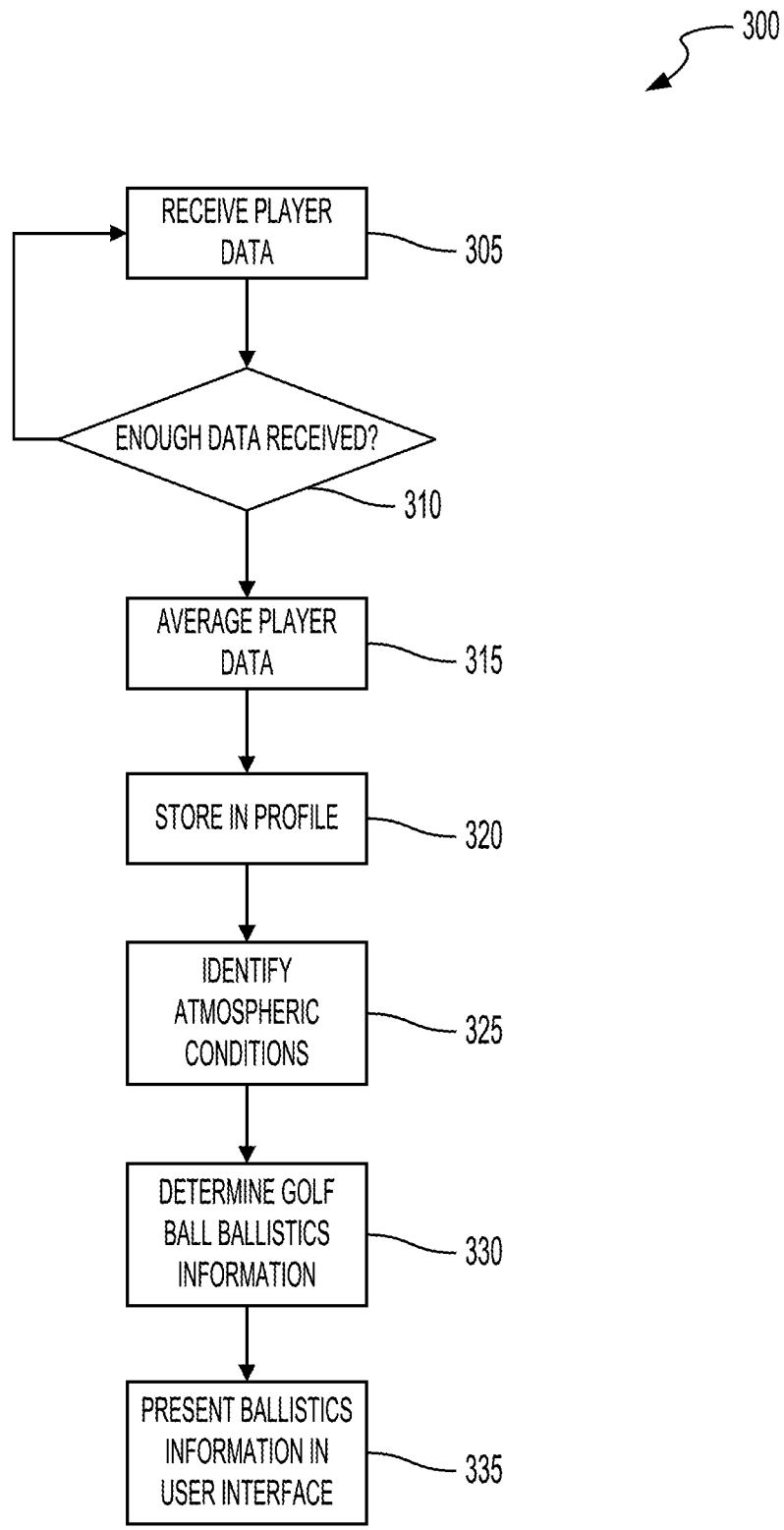
FIG. 3 is a block diagram illustrating an example method of using real-time ballistic computations to determine a predicted distance of a golf ball based on player profile information.

Referring now to FIG. 3, illustrated is a flow diagram of an example method 300 for real-time ballistic computations to determine a predicted distance given a golf club and ball and to improve the golf technique (e.g., club selection, etc.) of the player. The method 300 can be executed, performed, or otherwise carried out by the mobile device 205, the computer system 100 described herein in conjunction with FIGS. 1A-1B, or any other computing devices described herein. The mobile device (e.g., the mobile device 205) can receive player data (STEP 305). The mobile device can determine whether enough data has been received (STEP 310). The mobile device can average the player data (STEP 315). The mobile device can store the data in a player profile (STEP 320). The mobile device can identify atmospheric conditions (STEP 325). The mobile device can determine golf ball ballistics (STEP 330). The mobile device can present ballistics information in a user interface (STEP 335).

The mobile device (e.g., the mobile device 205) can receive player data (STEP 305). The mobile device can receive player data from the launch monitor (e.g., the launch monitor 220) to generate or update the player profile (e.g., the player profile 245). For example, the mobile device can receive maintain any of the data gathered by the launch monitor, such as flight data of the player, clubs used by the player, and golf balls used by the player. The flight data can include golf ball spin rate, max ord, golf ball carry distance, golf ball speed, and player swing speed. All of this information can be averaged information, or information that is gathered into many data points that are then averaged (or weighted averaged, etc.) to arrive at average player flight information under certain baseline atmospheric conditions. The mobile device can store this information as the player profile. To store the baseline atmospheric conditions, the mobile device can receive atmospheric conditions, for example, temperature, humidity, barometric pressure, GPS coordinates of the mobile device, and elevation, from one or more data sources via a network (e.g., the network 210) or from one or more components of the mobile device.

The mobile device can determine whether enough data has been received (STEP 310). The mobile device can determine if enough data has been received to create a baseline player profile. For example, the mobile device may use a predetermined number of data points (e.g., 5, 10, 20, 25, etc.) prior to averaging the flight data for each club of the player. The mobile device can utilize a counter to count the number of data points (e.g., swings, etc.) captured by the launch monitor (e.g., incrementing each time, etc.). If the counter is equal to or greater than a threshold number of swings, the mobile device can determine that enough data has been gathered to generate a user profile and perform step 315 of the method 300. If the counter is less than or equal to the threshold, the mobile device can continue to gather swing data from the launch monitor or other data sources (e.g., manual input, etc.).

The mobile device can average the player data (STEP 315). The mobile device can average the swing data and the flight data received from the launch monitor or other data sources to generate a player profile (e.g., the player profile 245). For example, for each swing recorded by the launch monitor, the mobile device can receive and store that information in one or more data structures in the memory of the mobile device. To generate a baseline player profile, the player mobile device can average each aspect (e.g., golf ball spin rate, max ord, golf ball carry distance, golf ball speed, and player swing speed, etc.) of the swings for a particular club used by the user to arrive at an average player profile. The mobile device can repeat this process for each club specified by the user.

The mobile device can store the data in a player profile (STEP 320), for example in a database (e.g., the database 215). In some implementations, the mobile device can access atmospheric conditions, such as those gathered from another computing device via the network, or from the launch monitor, and store the average player profile in association with the atmospheric conditions. As such, the baseline player swing and flight data is stored with information about the atmospheric conditions under which the swing and flight data was gathered, thereby creating a baseline profile for the player.

The mobile device can identify atmospheric conditions (STEP 325). After establishing the profile, the mobile device, for example as part of an application, may provide the functionalities detailed herein above or the functionalities detailed herein below, for example allowing the player to specify golf clubs, manually specify atmospheric conditions, or automatically gather and display atmospheric conditions from one or more sensors on the mobile device (e.g., thermometer, barometer, etc.), or from one or more other computing devices via a network (e.g., the network 210). The other computing devices can maintain, for example, the atmospheric data, and provide it to the mobile in response to one or more requests. The atmospheric conditions can include temperature, wind speed, elevation, barometric pressure, and humidity, among others. In some implementations, the atmospheric conditions can include one or more drag coefficients.

The mobile device can determine golf ball ballistics (STEP 330). The mobile device can determine ballistics for the golf ball based on the atmospheric conditions and the average flight data in the player profile (e.g., the player profile 245). For example, the flight pattern of the golf ball can be affected directly by the presence of air resistance and the rotation of the ball. Looking at both air resistance and rotation flight paths can be predicted. The air resistance and rotation are used to set up a system of differential equations that can be used to predict several different flight paths or distances. The temperature, elevation, barometric pressure, and wind speed can all effect the air resistance experienced by the golf ball. Example equations used to determine flight equations for a golf ball are included below:

$$\Sigma F_y = my''\text{-Weight-AirResistance+MagnusForce}$$

$$\Sigma F_x = mx''\text{-AirResistance+MagnusForce}$$

$$\Sigma F_z = mz''\text{-AirResistance+MagnusForce}$$

Where Fy is the force in the vertical direction (y-axis) experienced by the golf ball, and Fx and Fz describe motion on the plane parallel to the ground (x-axis and z-axis). The Weight is the average weight of a golf ball, AirResistance is the air resistance force experienced by the golf ball (e.g., based on atmospheric conditions, etc.), and MagnusForce is the lift force experienced based on the average spin of the golf ball (e.g., caused by the dimples on the surface, etc.).

The air resistance can be calculated, for example, using the following equation:

$$R = \left(\frac{1}{2}\right) C_D \rho A V^2$$

Where R is the force of air resistance, Cd is the drag coefficient, p is the air density (e.g., calculated based on temperature, humidity, barometric pressure, wind speed, etc.), A is the surface area of the golf ball, and V is the average velocity of the golf ball.

The Magnus force can be calculated using the following equation:

$$F_M = S(\omega \times V)$$

Where Fm is the Magnus force, S is the Magnus coefficient, $\omega$ is the average angular velocity of the golf ball (e.g., calculated based off spin data, etc.), V is the average velocity of the golf ball, and × indicates a cross-produce operation.

Using the force data, the mobile device can utilize Newton's laws of motion (e.g., F=ma, etc.) to calculate the exact distance the golf ball is likely to travel in the given atmospheric conditions. The mobile device can use the average values for the average initial speed and spin of the ball given a certain club in the above equations to accurately predict the distance traveled by the ball under different atmospheric conditions. The mobile device can store the expected distance for a particular golf club and for a particular set of atmospheric conditions in one or more data structures in the memory of the mobile device for use in computations by other components.

The mobile device can present ballistics information in a user interface (STEP 335). The mobile device can generate a user interface to display or gather any of the information described herein. For example, the user may populate one or more data structures, profile information, average ballistics or flight information, or any other information used by the mobile device or the components thereof. In addition, the mobile device can display or provide the results of any of the computations, for example in one or more windows, applications, or graphical representations on the display of the mobile device. The mobile device can display, for example as text or an image, the current atmospheric data, projected atmospheric data, future atmospheric data, or the expected distance a golf ball will travel for a particular club and player profile. If, for example, data gathered from a laser range finder (e.g., the laser range finder 250) indicates that the target hole is a certain distance away, the mobile device can display or suggest a club that will provide an average expected distance for a golf ball given the current or future atmospheric conditions.

References to "or" may be construed as inclusive so that any terms described using "or" may indicate any of a single, more than one, and all of the described terms.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for determining ballistics of golf balls in different atmospheric conditions, comprising:
receiving, by a mobile device comprising one or more processors via a network interface of the mobile device from a launch monitor comprising a high speed camera, a set of characteristics for each of a plurality of golf swings of a golf ball under baseline atmospheric conditions, the set of characteristics determined from high speed recordings of the golf swing and comprising a launch angle, a launch angular velocity, or a club head speed;
aggregating the set of characteristics from each of the plurality of golf swings in a data file stored in memory of the mobile device until determining, by a player profile accessor executed by the one or more processors, that the set of characteristics for the plurality of golf swings satisfies a threshold to create a player profile;

responsive to the determination, generating, by the player profile accessor, a player profile comprising an average of each characteristic of the aggregated sets of characteristics;

receiving, by a ballistics determiner executed by the one or more processors via the network interface from an external computing device, second atmospheric conditions different from the baseline atmospheric conditions, the second atmospheric conditions determined based on a location of the mobile device;

calculating, by the ballistics determiner, a triplet of forces on a golf ball when hit by a golf swing based on the average of each characteristic in the player profile;

calculating, by the ballistics determiner, a predicted distance traveled by the golf ball when hit by the golf swing under the second atmospheric conditions based on the calculated triplet of forces; and presenting, by the mobile device, in a graphical user interface via a display of the mobile device, the predicted distance traveled by the golf ball under the second atmospheric conditions.

2. The method of claim 1, wherein generating the player profile further comprises calculating, by the mobile device, the average of each of the set of characteristics for the plurality of golf swings.

3. The method of claim 2, wherein the set of characteristics for the plurality of golf swings comprises a golf club swing velocity, or a golf club swing angle.

4. The method of claim 1, wherein identifying the second atmospheric conditions further comprises:
transmitting, by the mobile device via the network interface, a request for the second atmospheric conditions to the external computing device; and
receiving, by the mobile device via the network interface, the second atmospheric conditions from the external computing device responsive to the request.

5. The method of claim 1, wherein calculating the predicted distance traveled by the golf ball further comprises calculating, by the mobile device, an air resistance force experienced by the golf ball when hit by the golf swing under the second atmospheric conditions.

6. The method of claim 5, wherein calculating the air resistance force is further based on a surface area of the golf ball.

7. The method of claim 1, wherein calculating the predicted distance traveled by the golf ball further comprises calculating, by the mobile device, a Magnus force experienced by the golf ball when hit by the golf swing under the second atmospheric conditions.

8. The method of claim 1, wherein calculating the predicted distance traveled by the golf ball further comprises an overall force experienced by the golf ball when hit by the golf swing under the second atmospheric conditions.

9. The method of claim 1, wherein determining that the set of characteristics for the plurality of golf swings satisfies the threshold further comprises retrieving, from the launch monitor, a second set of characteristics for each of a second plurality of golf swings under the baseline atmospheric conditions, responsive to determining that a number of the set of characteristics does not satisfy the threshold.

10. A system for determining ballistics of golf balls in different atmospheric conditions, comprising:
a mobile device comprising one or more processors executing a player profile accessor and a ballistics determiner, a network interface, and a memory device;
wherein the network interface is configured to receive, from a launch monitor comprising a high speed camera, a set of characteristics for each of a plurality of golf swings of a golf ball under baseline atmospheric conditions, the set of characteristics determined from high speed recordings of the golf swing and comprising a launch angle, a launch angular velocity, or a club head speed;

wherein the player profile accessor is configured to:
aggregate the set of characteristics from each of the plurality of golf swings in a data file stored in the memory device until determining that the set of characteristics for the plurality of golf swings satisfies a threshold to create a player profile, and
responsive to the determination generate a player profile comprising an average of each of the set of characteristics for the plurality of golf swings;

wherein the network interface is further configured to receive, from an external computing device, second atmospheric conditions different from the baseline atmospheric conditions, the second atmospheric conditions determined based on a location of the mobile device;

wherein the ballistics determiner is configured to:
calculate a triplet of forces on a golf ball when hit by a golf swing based on the average of each characteristic in the player profile,
calculate a predicted distance traveled by the golf ball when hit by the golf swing under the second atmospheric conditions based on the calculated triplet of forces, and
present, in a graphical user interface via a display of the mobile device, the predicted distance traveled by the golf ball under the second atmospheric conditions.

11. The system of claim 10, wherein to generate the player profile, the one or more processors are further configured to calculate the average of each of the set of characteristics for the plurality of golf swings.

12. The system of claim 11, wherein the set of characteristics for the plurality of golf swings comprises a golf club swing velocity, or a golf club swing angle.

13. The system of claim 10, wherein to identify the second atmospheric conditions, the network interface is further configured to:
transmit a request for the second atmospheric conditions to the external computing device; and
receive the second atmospheric conditions from the external computing device responsive to the request.

14. The system of claim 10, wherein to calculate the predicted distance traveled by the golf ball, the one or more processors are further configured to calculate an air resistance force experienced by the golf ball when hit by the golf swing under the second atmospheric conditions.

15. The system of claim 14, wherein the one or more processors are further configured to calculate the air resistance force further based on a surface area of the golf ball.

16. The system of claim 10, wherein to calculate the predicted distance traveled by the golf ball, the one or more processors are further configured to calculate a Magnus force experienced by the golf ball when hit by the golf swing under the second atmospheric conditions.

17. The system of claim 10, wherein to calculate the predicted distance traveled by the golf ball, the one or more processors are further configured to calculate an overall force experienced by the golf ball when hit by the golf swing under the second atmospheric conditions.

* * * * *